United States Patent [19]
Lee

[11] Patent Number: 5,839,063
[45] Date of Patent: Nov. 17, 1998

[54] AUTHENTICATION SYSTEM AND METHOD FOR PREVENTING WIRELESS COMMUNICATION FRAUD

[75] Inventor: David Y. Lee, Randolph, N.J.

[73] Assignee: Lucent Technologies Inc., Murray Hill, N.J.

[21] Appl. No.: 522,897

[22] Filed: Sep. 1, 1995

[51] Int. Cl.$^6$ ................................................ H04Q 7/00
[52] U.S. Cl. ........................................ 455/410; 455/422
[58] Field of Search .................... 379/88, 89; 380/21, 380/23; 455/422, 410, 517, 524

[56] References Cited

U.S. PATENT DOCUMENTS

| | | | |
|---|---|---|---|
| 4,955,049 | 9/1990 | Ghisler | 379/58 |
| 5,335,265 | 8/1994 | Cooper et al. | 455/33.1 |
| 5,335,278 | 8/1994 | Matchett et al. | 379/59 |
| 5,337,345 | 8/1994 | Cassidy et al. | 455/33.1 |
| 5,345,595 | 9/1994 | Johnson et al. | 455/33.1 |
| 5,420,910 | 5/1995 | Rudokas et al. | 455/33.1 |
| 5,440,758 | 8/1995 | Grube et al. | 455/54.1 |
| 5,535,431 | 7/1996 | Grube et al. | 455/33.1 |
| 5,555,192 | 9/1996 | Grube et al. | 455/33.1 |

*Primary Examiner*—Reinhard J. Eisenzopf
*Assistant Examiner*—Marsha D. Banks-Harold

[57] ABSTRACT

An improved wireless communication system including a process and apparatus for detecting and preventing fraudulent usage of wireless communication service. The improvement includes a central database in communication with wireless communication networks and paging networks, with the central database being capable of determining when a wireless terminal is being fraudulently used in a wireless communication network. The central database is further capable of sending a paged message to the subscriber notifying the subscriber of the suspected fraudulent usage.

19 Claims, 7 Drawing Sheets

AUTHENTICATION SYSTEM AND METHOD FOR PREVENTING WIRELESS COMMUNICATION FRAUD

FIELD OF THE INVENTION

The present invention relates generally to communication networks, and more particularly to an authentication system and method for preventing wireless communication fraud.

BACKGROUND OF THE INVENTION

Figure 1:
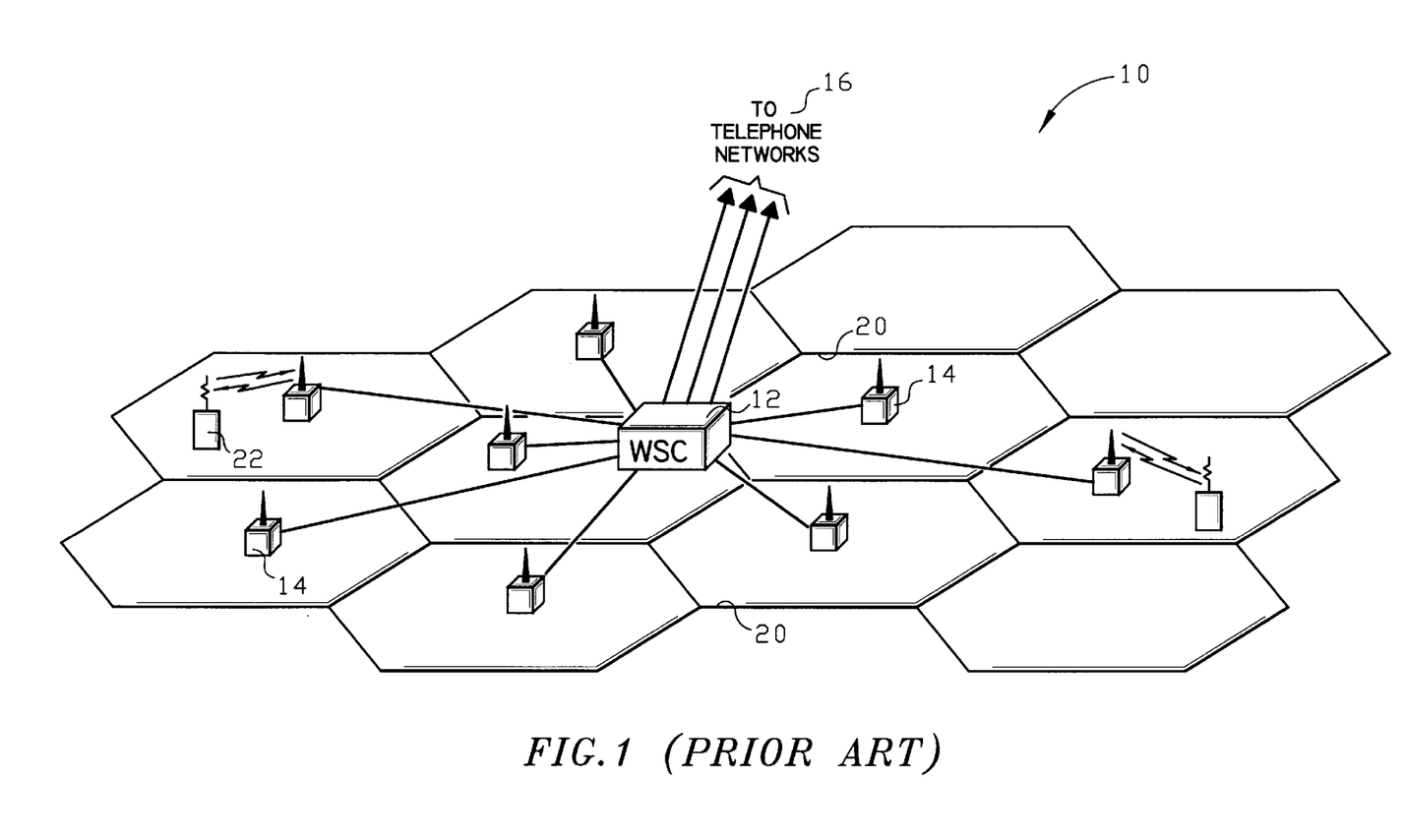
FIG. 1 is a schematic diagram of a portion of a wireless communications system.

FIG. 1 depicts a schematic diagram of a portion of a typical wireless communications system in the prior art designated generally as 10, which system serves a number of wireless terminals that are situated within a geographic area. The heart of a typical wireless system is known as a Wireless Switching Center ("WSC") 12. Typically, WSC 12 is connected to a number of base stations 14, which are distributed throughout the geographic area serviced by system 10, and the local and long distance telephone networks 16. WSC 12 routes or "switches" calls between wireless terminals 22 or between a wireless terminal 22 and a wireline terminal (not shown) which are commonly connected to system 10 via the local and/or long distance networks 16.

The geographic area serviced by system 10 is partitioned into a number of spatially distinct areas called "cells" 20. As depicted in FIG. 1, each cell 20 is schematically represented by a hexagon; in practice, however, each cell 20 usually has an irregular shape that depends on the topography of the terrain serviced by system 10. Typically, each cell 20 contains a base station 14, which includes the antennas and radios that base station 14 uses to communicate with wireless terminals 22 and also includes the transmission equipment that base station 14 uses to communicate with WSC 12. The structure and general operation of various types of commercially available wireless communication systems is well documented in the patent and communication arts literature.

Fraudulent use or theft of service is one of the principal business and technical problems faced by wireless communication service companies today. "Fraudulent user" denotes anyone who seeks to obtain or does in fact obtain unauthorized wireless service. Fraudulent use can take several forms. A first example of such fraudulent use involves the theft of a wireless terminal and subsequent unauthorized use in the same or different geographic area. Second, cloning or duplicating a valid mobile telephone by securing authorization data of a valid subscriber is another such fraudulent use. Third, fraudulent use of wireless services may involve the use of random, unauthorized Electronic Serial Number— Mobile Identification Number (ESN-MIN) data. This data can be randomly generated by a data sequence generator to attempt to gain fraudulent access to wireless services. Finally, hijacker or subscription fraud schemes generally involve an increase in the transmitted power level of the fraudulent user's wireless terminals. This often enables the fraudulent user to take over a legitimate mobile radio traffic channel assigned by the service provider company to another mobile subscriber.

Figure 2:
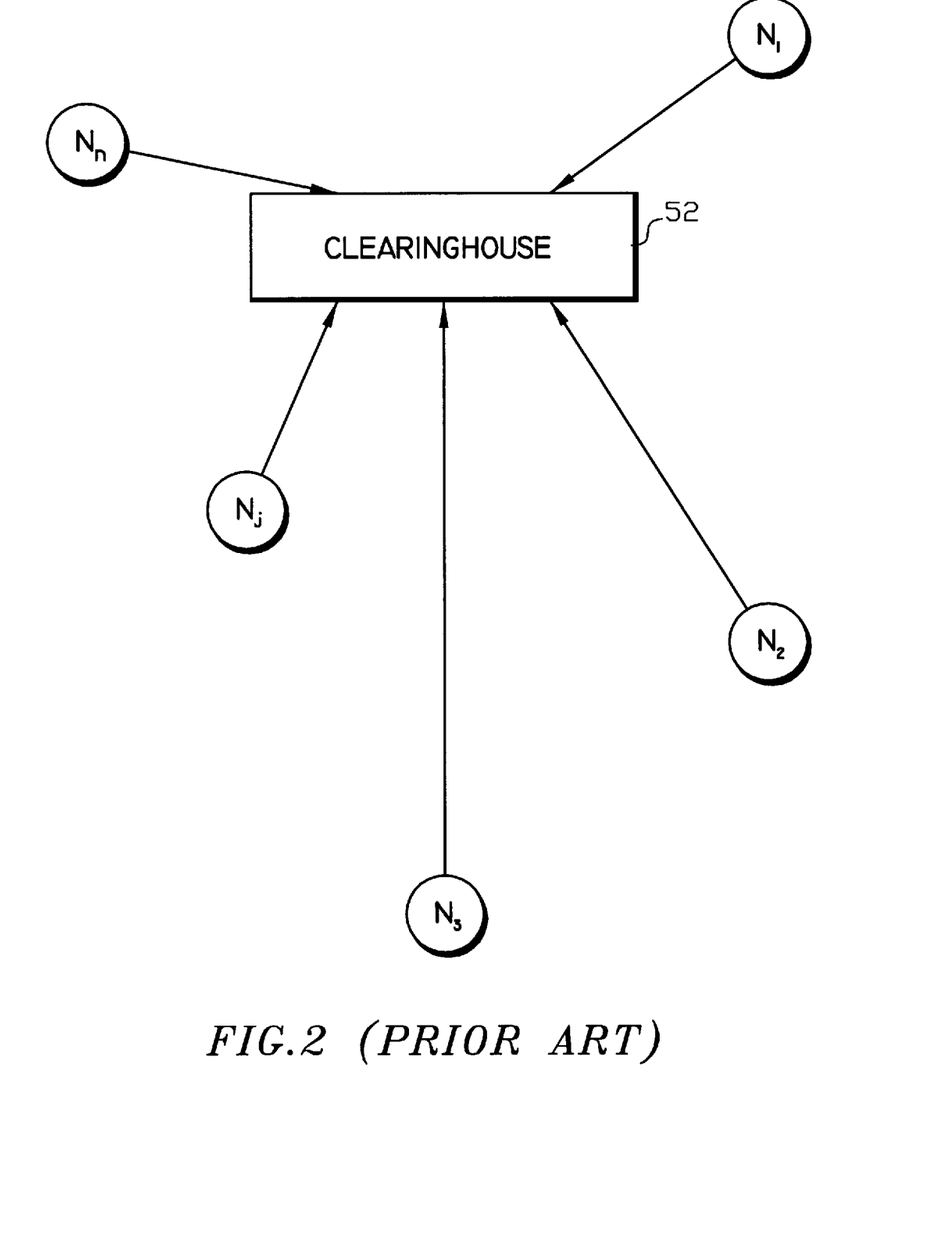
FIG. 2 is a block diagram of prior art communication networks in communication with a clearinghouse for detecting fraudulent usage.

As shown in FIG. 2, numerous wireless networks $N_1$, $N_2$, ... $N_j$, ... $N_n$, each under the control of a wireless service provider, provide wireless communications service to subscribers within assigned geographical areas. The wireless networks $N_1$-$N_n$ also automatically transfer calls to other segments of the nationwide telephone system, for example, through network switches. For primarily billing monitoring purposes, prior art wireless telephone systems have utilized clearinghouse type service centers 52. While wireless networks $N_1$-$N_n$ and commercial clearinghouse 52 exchange substantial data, fraud cannot be detected before or during service due to lack of an appropriate protocol. Some switch manufacturers use proprietary protocols which operate only between switches of that manufacturer. Where implemented, these protocols have stopped some fraud, but not cloning. This practice and inability to identify fraudulent service requests before and during service has resulted in increasingly costly losses for the wireless telephone industry.

An attempt to prevent fraudulent use or theft of wireless service is described in U.S. Pat. No. 4,955,049. The '049 patent teaches generating a call sequence list in connection with the accounting and billing records of an authorized subscriber. The call sequence list permits a legitimate subscriber to differentiate between authorized and unauthorized calls. However, this call sequence process does not detect the fraudulent use before or during the time that wireless service is granted. Rather, the '049 patent teaches a system that only distinguishes between authorized and unauthorized calls on a subscriber's wireless telephone bill.

SUMMARY OF THE INVENTION

In a preferred embodiment of the present invention, there is provided an improved wireless process and system, which incorporates a fraud prevention apparatus that detects fraudulent use in a wireless communication system before or during the time in which service is initially granted to an unauthorized user.

An embodiment of the present invention relates to a fraud prevention apparatus which includes a central database capable of storing usage threshold data of wireless communications subscribers. The usage threshold data may, for example, consist of: calling duration data; call frequency data; exclusion geographical site data or any combination thereof. The central database communicates with at least one wireless communication network and with at least one paging network. Further, a processor determines when current subscriber usage exceeds the usage threshold data stored within the database.

An interface connects the processor to at least one paging system. The paging system may page the subscriber when fraudulent activity is detected. The processor may automatically initiate termination of wireless service once fraudulent use is detected. Alternately, the subscriber may initiate the termination.

BRIEF DESCRIPTION OF THE DRAWINGS

Further features of the present invention will become readily apparent from the following detailed description of the invention taken in conjunction with the accompanying drawings in which like reference numerals identify similar or identical elements, for which.

DETAILED DESCRIPTION OF THE PREFERRED EMBODIMENTS

Figure 3:
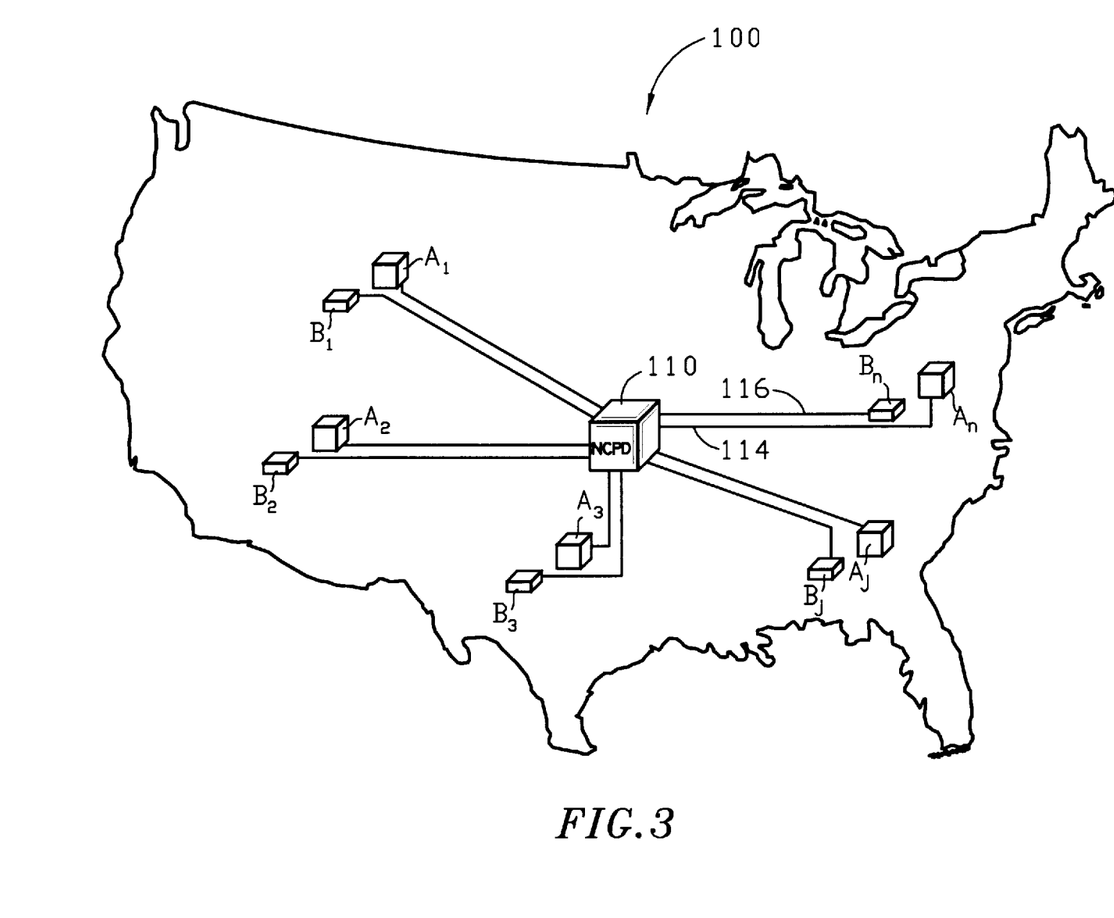
FIG. 3 is a schematic block diagram of one embodiment of the present invention in combination with a plurality of domestic wireless networks in a nationwide wireless communication system.

Referring to FIG. 3, there is shown an improved wireless communications system, designated generally as 100, which incorporates an embodiment of the authentication system and method for preventing wireless communication fraud in accordance with the present invention. Wireless system 100 includes a National Calling Profile Database (NCPD) 110. As will be described in more detail below, NCPD 110 has processing capability in addition to the storage capacity of a database in the conventional sense. NCPD 110 communicates with conventional wireless communication networks $A_1, A_2, \ldots A_j, \ldots A_n$, under the control of a common wireless service provider. NCPD 110 may also communicate with other wireless networks (not shown) under the control of different service providers. Each of the wireless networks $A_1-A_n$ provides telecommunication services to subscribers calling from a local region associated with that wireless network. Each subscriber serviced by the common service provider can wirelessly communicate via any one of the networks $A_1-A_n$, from anywhere within a larger geographical region, such as within the continental United States. This larger geographical region encompasses all of the local regions serviced by the networks $A_1-A_n$.

Wireless system 100 further includes conventional paging networks $B_1, B_2, \ldots B_j, \ldots B_n$, each providing paging service within the same local regions as wireless networks $A_1-A_n$, respectively. The paging networks $B_1-B_n$, which may be under the control of the same service provider associated with the wireless networks $A_1-A_n$, provide paging services to the same subscribers serviced by the wireless networks $A_1-A_n$. Paging networks $B_1-B_n$ are also in communication with NCPD 110. Other paging networks (not shown) under the control of different service providers may also communicate with NCPD 110.

NCPD 110 may communicate with wireless networks $A_1-A_n$ and paging networks $B_1-B_n$ through conventional low cost data communication links 114 and 116, respectively, which may be fiber optic or coaxial cabling. Alternatively, NCPD 110 can transmit data to the service providers $A_1-A_n$ via microwave antenna and orbital satellite systems, both of which are well known in the art. NCPD 110 may communicate with service providers $A_1-A_n$ and paging networks $B_1-B_n$ with any other appropriate communication scheme.

Figure 4:
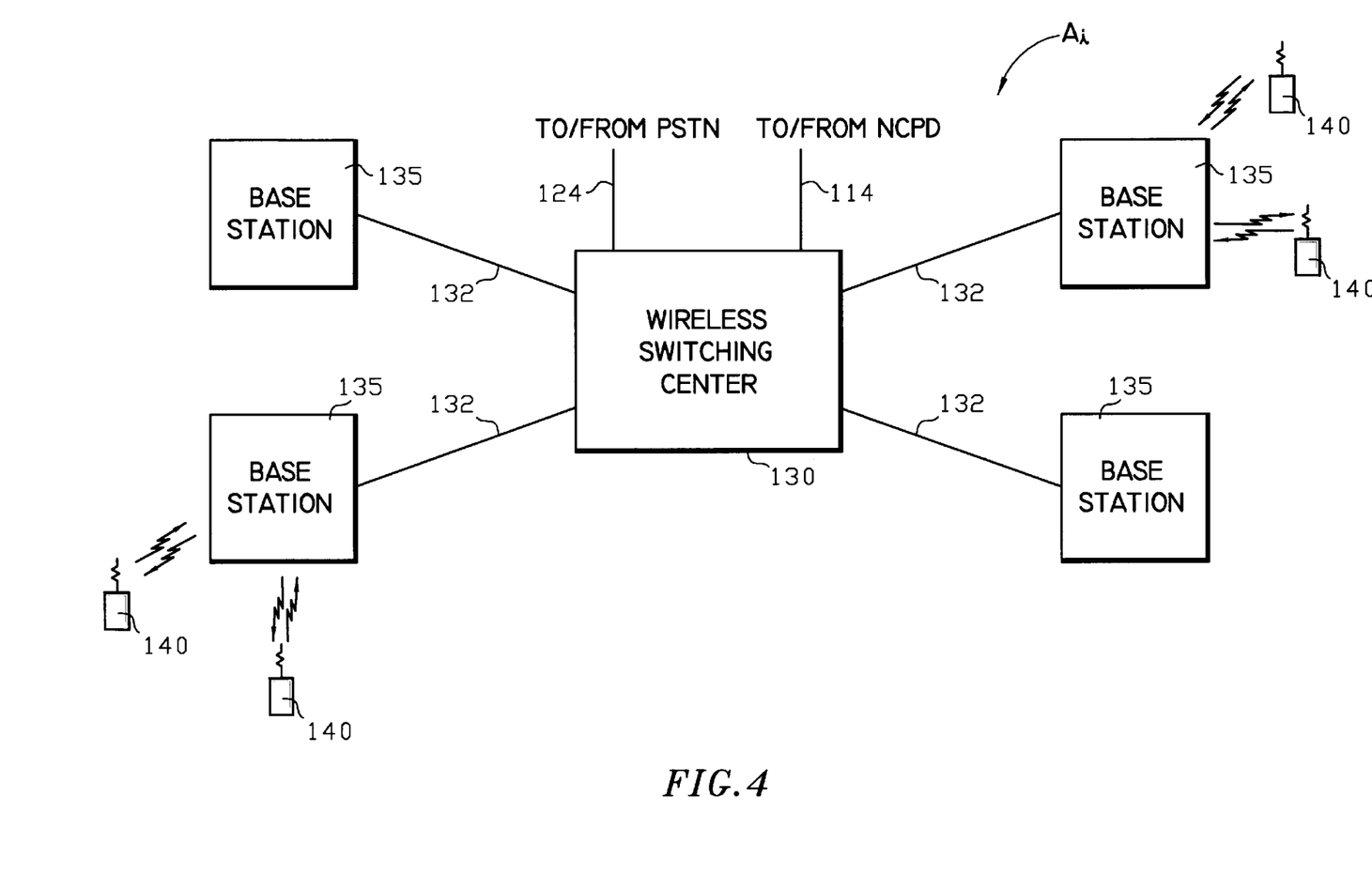
FIG. 4 is a schematic block diagram of a wireless communications network which may be used in the system of FIG. 3.

Referring now to FIG. 4, a block diagram of an exemplary wireless network $A_i$ is shown which may be the configuration used for any of the wireless networks $A_1-A_n$ of system 100. Wireless network $A_i$ may be configured, for example, with protocols used in a conventional cellular network, with the added capability of being able to communicate with NCPD 110. It is understood that other protocols may alternatively be employed, such as those used for the relatively new Personal Communications Networks (PCNs), and that the invention is not limited to cellular networks.

Network $A_i$ includes a wireless switching center 130 that switches numerous communication messages to and from the Public Switched Telephone Network (PSTN) and wireless base stations 135. Communications messages are transceived between the PSTN and switching center 130 on communication link 124 which may be trunked fiber optic cables. These communication messages may be audio messages as in standard telephone calls, or electronic data as in facsimile or computer to computer communications.

Each call originating from a PSTN user that is intended for a particular wireless terminal 140, is switched by switching center 130 to the base station 135 that is generally closest to the intended wireless terminal. Base station 135 then wirelessly transceives the communication messages to and from the wireless terminal 140. A communication link 132 between each base station 135 and switching center 130 carries the communication messages therebetween. Link 132 may be a wireline link if the base stations 135 and switching center 130 are ground based. If switching center 130 and/or base stations 135 are satellite-based as for example, in spot beam systems, then links 132 are typically time domain multiplied (TDM) microwave links.

Figure 5:
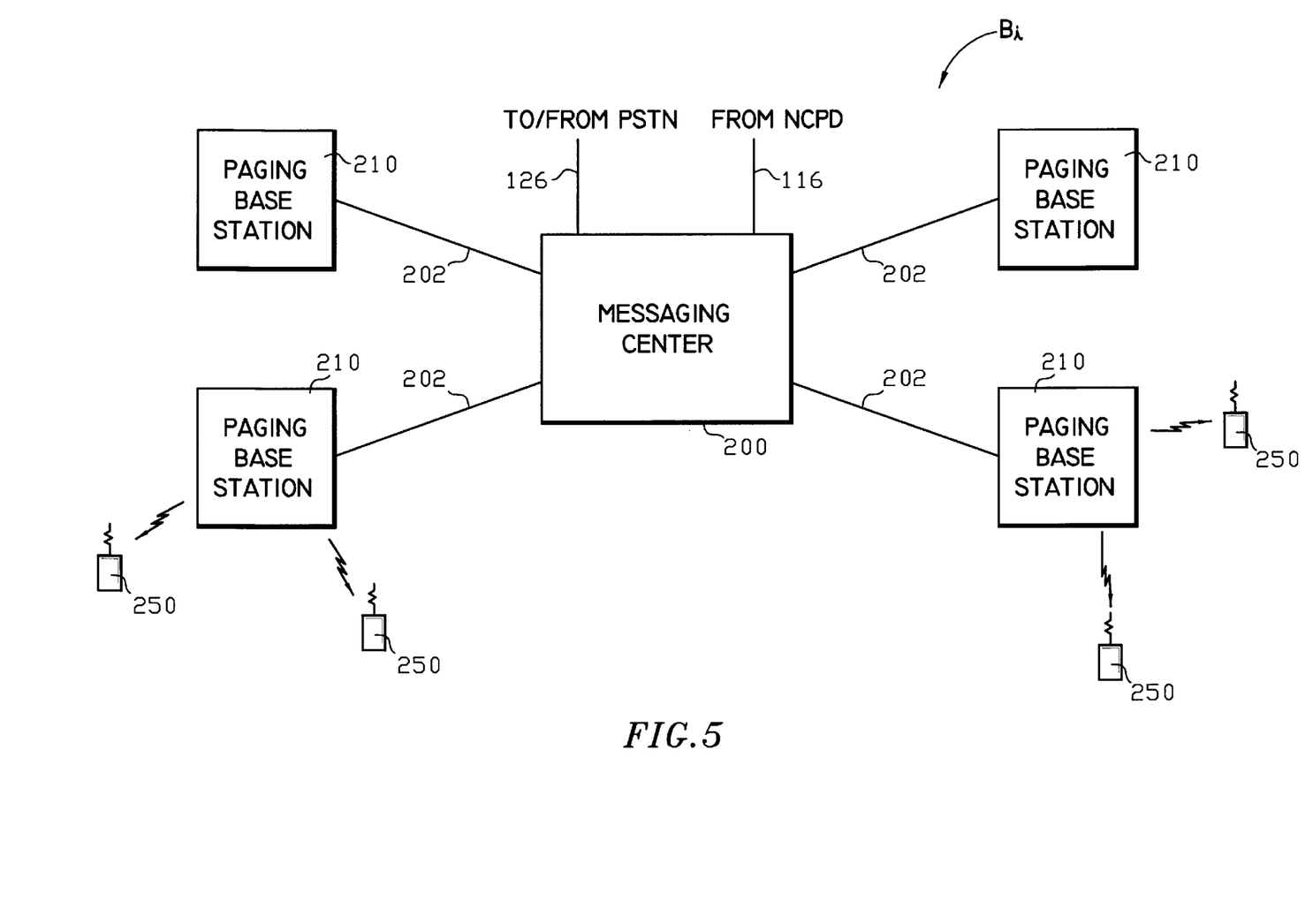
FIG. 5 is a schematic block diagram of a paging network which may be used in the system of FIG. 3.

Turning now to FIG. 5, a block diagram of an illustrative paging network $B_i$ may be used as the configuration for any of the paging networks $B_1-B_n$ of system 100. Paging network $B_i$ includes a messaging center 200 that interfaces with the PSTN and NCPD via communication links 126 and 116, respectively. Messaging center 200 is also coupled to each one of a number of paging base stations 210 by means of communication links 202. Each paging base station 210 operates to send wireless paging messages to pagers 250 generally within a predetermined distance of that paging base station 210. Each pager 250 is intended to page an associated subscriber of the wireless networks $A_1-A_n$. A page is initiated by NCPD 110 when fraudulent use of the subscriber's wireless terminal is suspected. When a page is effectuated, a telephone number may be displayed on pager 250 corresponding to a telephone phone number of the messaging center 200. The subscriber can then retrieve the message by telephoning the messaging center 200. At the option of the subscriber, pager 250 may also function to provide standard paging services.

Figure 6:
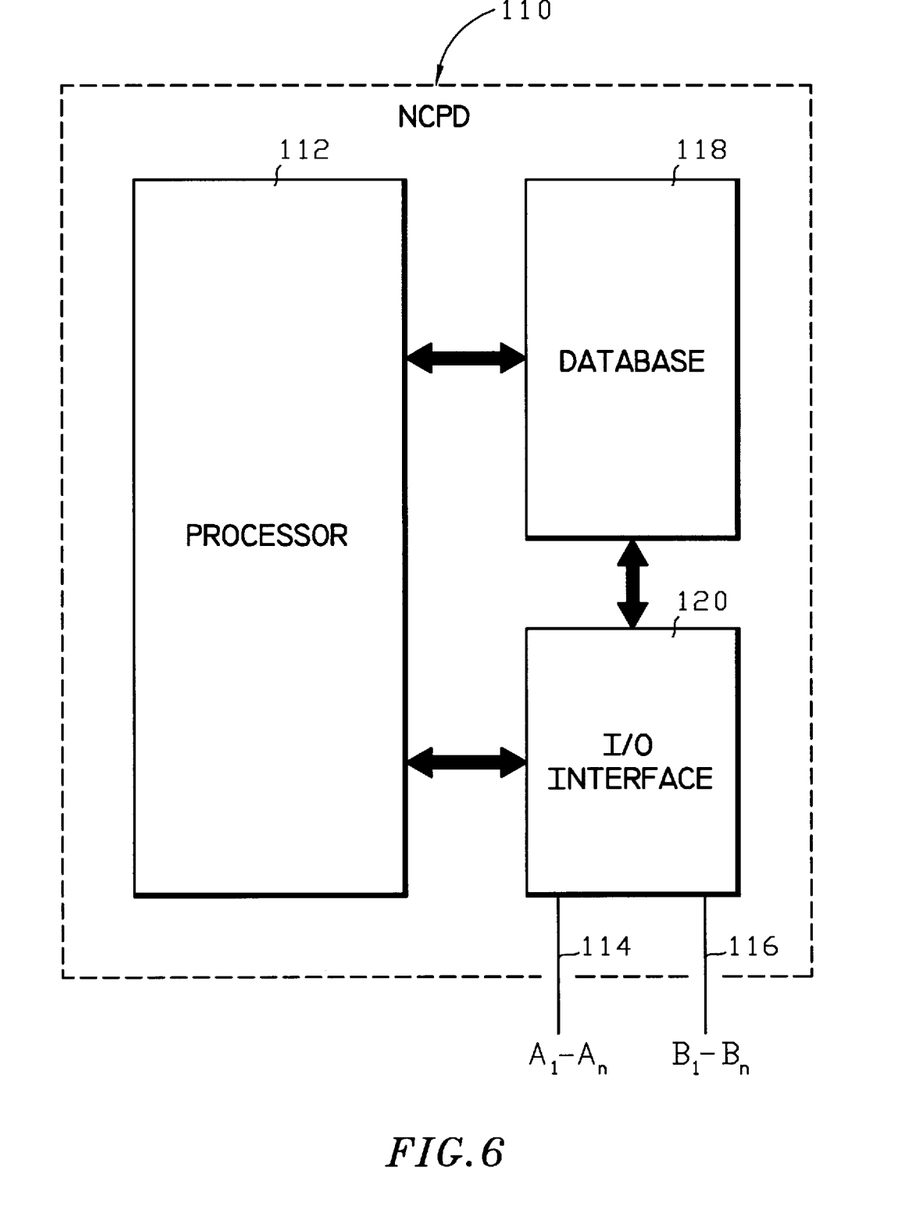
FIG. 6 is a block diagram of a National Calling Profile Database of FIG. 3 in accordance with an embodiment of the present invention.

Referring now to FIG. 6, NCPD 110 includes a processor 112 that monitors current usage patterns for subscribers to determine if a threshold is exceeded for any subscriber. As will be described in further detail below, when a subscriber exceeds the threshold value, NCPD 110 may alert the subscriber to possible fraudulent usage. If the subscriber confirms fraudulent usage, wireless service may then be terminated at the option of the subscriber by contacting the service provider. Alternatively, NCPD 110 may initiate automatic termination of service to a wireless terminal when fraudulent usage is suspected. This is accomplished by the NCPD 110 sending an appropriate command to one or more of the wireless networks $A_1-A_n$ to effectuate service termination.

The expected usage pattern data for the subscribers may be stored within a database 118 coupled to processor 112. This usage pattern data includes usage pattern information such as, for example: the typical or average duration of a subscriber's wireless telephone calls; the frequency of calls; and geographic locations of the wireless networks from which calls originate and the locations to which the outgoing calls are placed. Usage pattern data can also be recorded for particular periods of time such as time-of-day and time-of-year. This data may reflect changes in any given subscriber's typical daily wireless terminal telephone activity and changes during certain periods of the year. For example, subscribers may increase their usage during peak periods.

Usage pattern data can be determined in a number of ways, for example, by having the subscriber complete a detailed questionnaire regarding anticipated wireless telephone usage using criteria such as that described above. Another method for determining usage pattern data entails the service provider reviewing past individual subscriber usage patterns. Usage patterns can be studied at regular intervals to periodically update the stored usage pattern data. Once usage pattern data is established, usage thresholds can be determined, which, if exceeded, raise a flag of fraudulent use.

As mentioned above, NCPD 110 includes processor 112 which is operational to constantly compare incoming data from the various wireless networks $A_1$–$A_n$ with information stored in database 118 of NCPD 110. NCPD 110 also includes an input/output (I/O) interface 120 for interfacing NCPD 110 with paging networks $B_1$–$B_n$ and wireless networks $A_1$–$A_n$. Interface 120 may be a multi-channel modem using an appropriate protocol for data communication with the networks $A_1$–$A_n$ and $B_1$–$B_n$. Optionally, several modems (not shown) may be used for interface 120, each for communication with a separate wireless network $A_1$–$A_n$ or a separate paging network $B_1$–$B_n$. As will be described in further detail below, when a stored usage threshold is exceeded for a particular call at a wireless terminal, database 118, via interface 120, automatically initiates a paging message regarding suspected fraudulent activity via one of the paging networks $B_1$–$B_n$. This message may notify the subscriber associated with that wireless terminal of the outgoing telephone number to which the call was placed. The paging message is received by the subscriber on an individual pager 250, mentioned above. Optionally, the paging message may be an alert signal such as an audible tone, whereupon the subscriber could then call the messaging center 200 (FIG. 5) to obtain a detailed message concerning the suspected fraudulent activity.

Figure 7:
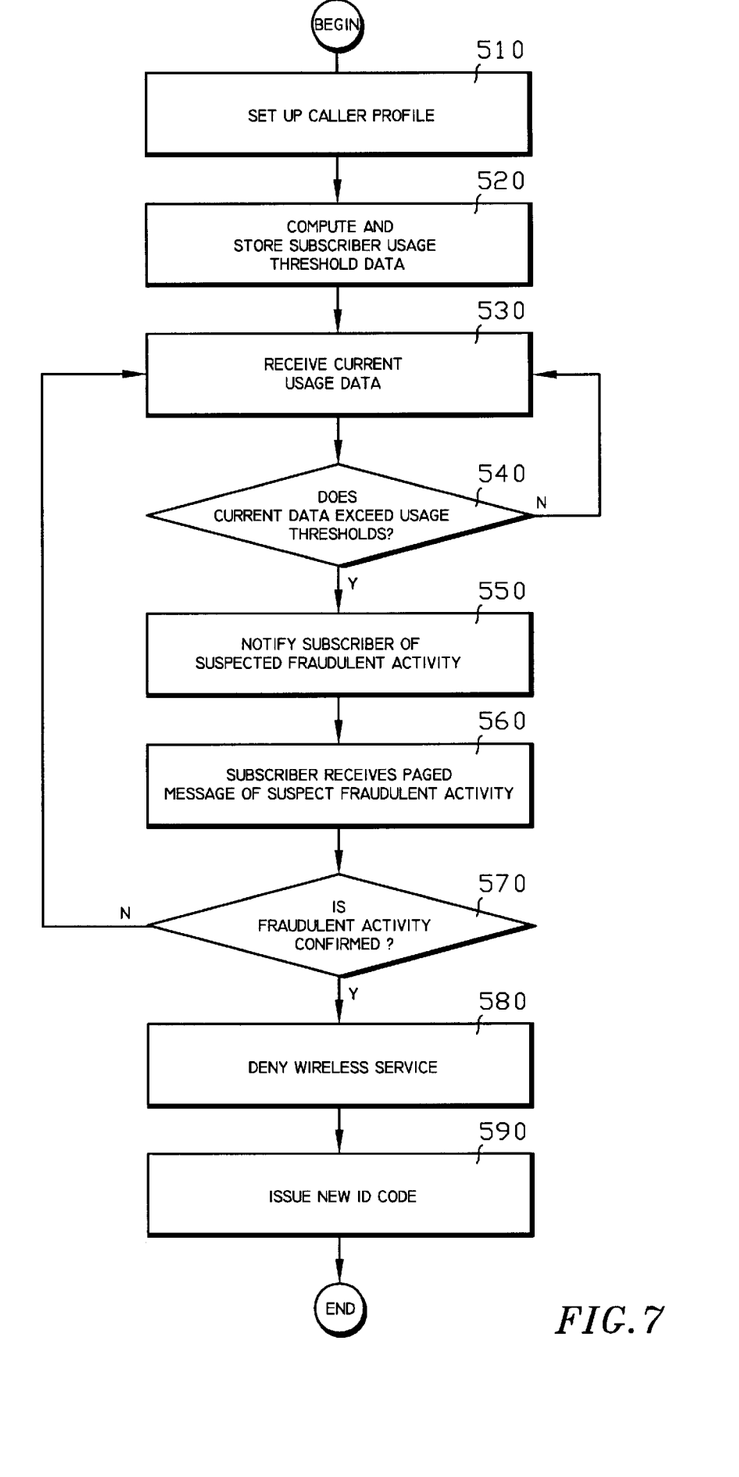
FIG. 7 is a logic flow diagram illustrating the operation of the system of FIG. 3.

With reference now to FIG. 7, in conjunction with FIGS. 3–6, a process for preventing wireless communications fraud will be described below. First, when a subscriber of the wireless networks $A_1$–$A_n$ initially subscribes to the authentication process offered by NCPD 110, the subscriber must set up a caller profile, block 510. This may be done by the subscriber programming an expected calling pattern into database 118 of NCPD 110. (Programming may be effectuated automatically by the subscriber responding on a touch-tone telephone to voice prompts initiated by NCPD 110). As mentioned above, the expected calling pattern takes into account, for example: the expected duration of calls; frequency of calls; geographic locations from which calls are placed and/or of the call destinations, and expected time patterns of calls. Once the expected calling pattern data is inputted to processor 112, subscriber usage threshold data is computed by processor 112 using predetermined criteria, block 520. The threshold data is then stored in database 118. When this threshold data is exceeded by subsequent usage of the associated wireless terminal, fraudulent activity is suspected. Alternatively, the subscriber may program the usage threshold data itself into the processor 112 rather than the expected calling pattern data, thus obviating the need for processor 112 to compute the thresholds.

For example, illustrated below in Table 1 is exemplary data relating to the usage threshold data of a subscriber. With the usage threshold data stored in database 118, when a wireless terminal associated with that subscriber is engaged in activity which exceeds the stored usage threshold data (e.g., Table 1), processor 112 is instructed to notify the subscriber of the fraudulent usage, via paging network $B_1$–$B_n$. As an example, the usage threshold data may be exceeded when the wireless telephone associated with the subscriber is a) engaged in a call of longer than 30 minutes; or, b) initiates more than 4 calls a day; or, c) is used in a geographic region outside of New York, New Jersey or Pennsylvania; or when a predetermined combination of (a), (b) or (c) occurs.

TABLE 1

EXAMPLE OF SUBSCRIBER USAGE THRESHOLD DATA

| | |
|---|---|
| Calling Duration: | 30 minutes |
| Calling Frequency: | 4 times a day |
| Exclustion Geographical Site: | New York, New Jersey, Pennsylvania |

When the subscriber's wireless terminal is used to make a call, the information pertaining to that call is relayed from the wireless network $A_1$–$A_n$ which received the call to NCPD 110, via transmission channel 114, block 530. The received calling information is then processed in processor 112 so as to analyze the calling pattern, block 540. If the analyzed calling pattern exceeds the threshold values established in block 520, NCPD 110 sends a paging message, via transmission channel 116, to the paging network $B_1$–$B_n$ in which the subscriber is located, block 550.

The subscriber then receives the paged message from NCPD 110 in block 560. After the subscriber receives this paged message and if the subscriber confirms it is fraudulent activity, the subscriber then reports the fraudulent activity to the subscriber's service provider, block 570. Rather than imposing penalties to subscribers who fail to notify the service provider of the fraudulent activity, the service provider may provide incentives such as rewards including credits to the subscriber's wireless telephone account, or an allotment of "free" wireless telephone calls or air time for subscribers who promptly notify the service provider of the fraudulent activity.

NCPD 110 may further automatically deny wireless communications service during the occurrence of suspected fraudulent activity by an unauthorized user. In this scenario, a subscriber is notified of the suspected fraudulent activity through one of the paging networks $B_1$–$B_n$ and must contact the subscriber's service provider so as to resume wireless communications activity.

Once a service provider is notified by the subscriber of the fraudulent activity, the service provider may then deny wireless service to the wireless terminal associated with the subscriber's account, in block 580. The service provider may then issue a new identifying code to the subscriber's wireless terminal, block 590, so as to prevent future fraudulent use. Such identifying code may include for example, the Electronic Serial Number (ESN) and/or Mobile Identification Number (MIN).

Thus, the fraud prevention system disclosed herein provides rapid discovery and feedback regarding suspected fraudulent activity in contrast to existing methods of wireless telephone fraud prevention, as mentioned above, which only provide information regarding wireless telephone activity to subscribers in a billing statement which is received by the subscriber on a monthly basis.

It is to be understood that the embodiments described herein are merely exemplary and that one skilled in the art can make many modifications and variations to the disclosed embodiments without departing from the spirit or scope of the invention. For example, the present invention is not to be understood to be limited to employment in a cellular network, but rather may be employed into numerous wireless communication systems, such as a Personal Communication Network (PCN) or into communication systems utilizing Personal and/or Terminal Mobility managers. Accordingly, all such modifications and variations are intended to be included within the scope of the invention as defined by the appended claims.

What is claimed is:

1. A wireless communication system comprising:
   at least one wireless communication network capable of providing wireless communication services to a plurality of subscribers;
   a database in communication with said at least one wireless communication network capable of storing usage threshold data, said database including a processor for determining when current subscriber usage of any of said plurality of subscribers exceeds said stored usage threshold data; and
   at least one paging network in communication with said database capable of notifying any of said subscribers by sending a page to a pager associated with said subscribers when said usage threshold data is exceeded.

2. A wireless communication system as recited in claim 1, wherein said at least one wireless communications network is operable to monitor current subscriber usage data, and further including a data transmission network for transmitting said current subscriber usage data from said at least one wireless communication network to said database.

3. A wireless communication system as recited in claim 1, further including an interface for transmitting a command from said database to any of said paging networks so as to activate said paging network to notify a subscriber of fraudulent activity.

4. A wireless communication system as recited in claim 1, wherein said database is operational to communicate with said at least one wireless communication network so as to deny service to a wireless terminal associated with a subscriber when said stored usage data is exceeded.

5. A wireless communication system as recited in claim 1, wherein said usage data is selected from the group consisting of calling duration data, call frequency data, exclusion geographical site data and combinations thereof.

6. A wireless communication system as recited in claim 5, wherein said database is operational to update said usage data in accordance with any one of said subscribers' average daily wireless terminal activity.

7. A wireless communication system as recited in claim 1, further including a plurality of wireless communication networks and a plurality of paging systems.

8. A wireless terminal fraud prevention apparatus comprising:
   a database capable of storing usage data of at least one subscriber, said database being in communication with at least one wireless communication network;
   a processor capable of determining when current subscriber usage exceeds a stored usage threshold related to said usage data; and
   an interface connecting said processor to at least one paging system capable of transmitting a paged message to a pager associated with said subscriber when said usage threshold is exceeded.

9. A wireless terminal fraud prevention apparatus as recited in claim 8, wherein said at least one wireless communication network is operable to monitor current subscriber usage data, and further including a data transmission network for transmitting said current subscriber usage from said at least one wireless communication network to said database.

10. A wireless terminal fraud prevention apparatus as recited in claim 8, wherein said database is operational to communicate with said at least one wireless communication network to deny wireless service to a fraudulent user when said current subscriber usage exceeds said stored usage threshold.

11. A wireless terminal fraud prevention apparatus as recited in claim 8, wherein said usage threshold is selected from the group consisting of calling duration data, call frequency data, exclusion geographical site data and combinations thereof.

12. A wireless terminal fraud prevention apparatus as recited in claim 11, wherein said database is operational to update said usage data in accordance with averaged daily wireless terminal activity of said at least one subscriber.

13. A wireless terminal fraud prevention apparatus as recited in claim 8, wherein said database is in communication with a plurality of wireless communication networks and said interface is coupled to a plurality of paging systems.

14. A process for preventing fraudulent usage of wireless communication service, comprising:
   storing usage data of at least one subscriber;
   determining if said stored usage data is exceeded by current usage data; and
   sending a paged message to a pager associated with said subscriber when said usage data is exceeded.

15. A process of preventing fraudulent usage of wireless communication service as recited in claim 14, wherein said storing of usage data includes storing said usage data in a central database.

16. A process for preventing fraudulent usage of wireless communication service as recited in claim 15, further including transmitting said current usage data from at least one wireless communication network to said central database.

17. A process for preventing fraudulent usage of wireless communication service as recited in claim 15, further including updating said usage data stored in said central database with data indicative of averaged daily wireless terminal activity of said at least one subscriber.

18. A process for preventing fraudulent usage of wireless communication service as recited in claim 14, further including terminating wireless communication service to a wireless terminal associated with said subscriber when said usage data is exceeded.

19. A process of preventing fraudulent usage of wireless communication service as recited in claim 14, further including selecting said usage data from the group consisting of calling duration data, call frequency data, exclusion geographical site data and combinations thereof.

* * * * *